United States Patent
Fox et al.

(10) Patent No.: US 10,530,674 B2
(45) Date of Patent: Jan. 7, 2020

(54) SYSTEM AND METHOD FOR INFORMATION SHARING IN AN ENTERPRISE

(71) Applicant: Avaya Inc., Santa Clara, CA (US)

(72) Inventors: Ronan Fox, Co. Galway (IE); Sean Burke, Galway (IE); Tommy Morris, Co. Galway (IE); Donal Ward, Co. Galway (IE)

(73) Assignee: Avaya Inc., Santa Clara, CA (US)

(*) Notice: Subject to any disclaimer, the term of this patent is extended or adjusted under 35 U.S.C. 154(b) by 228 days.

(21) Appl. No.: 14/301,657

(22) Filed: Jun. 11, 2014

(65) Prior Publication Data

US 2015/0363431 A1 Dec. 17, 2015

(51) Int. Cl.
*H04L 12/26* (2006.01)
*G06Q 10/10* (2012.01)

(52) U.S. Cl.
CPC ........... *H04L 43/08* (2013.01); *G06Q 10/101* (2013.01)

(58) Field of Classification Search
CPC ........ G06Q 30/02; G06Q 30/06; G06Q 10/10; G06Q 50/01; G06Q 30/0269; G06Q 50/00; G06Q 10/101; G06F 17/30867; G06F 17/3053; G06F 16/21; G06F 16/955; G06F 16/23; G06F 17/30289; G06F 17/30345; G06F 17/30876; H04L 67/22; H04L 43/08; H04L 67/12; H04L 67/141; H04L 65/403; H04W 4/003; H04W 4/206
See application file for complete search history.

(56) References Cited

U.S. PATENT DOCUMENTS

| | | | | |
|---|---|---|---|---|
| 6,643,622 B2* | 11/2003 | Stuart | ..................... | G10L 15/26 379/88.01 |
| 8,370,155 B2* | 2/2013 | Byrd | ..................... | G06Q 10/10 379/88.01 |
| 8,990,307 B2* | 3/2015 | Barreto | ..................... | G06F 15/16 709/205 |
| 9,197,718 B2* | 11/2015 | Kiang | ..................... | H04L 67/327 |
| 9,213,684 B2* | 12/2015 | Lai | ..................... | G06F 17/2247 |
| 2002/0019737 A1* | 2/2002 | Stuart | ..................... | G10L 15/26 704/275 |
| 2008/0004945 A1* | 1/2008 | Watson | ............ | G06Q 10/06398 705/7.42 |
| 2009/0097634 A1* | 4/2009 | Nambiar | ............. | H04M 3/5183 379/265.09 |
| 2010/0169148 A1* | 7/2010 | Oberhofer | .............. | G06Q 10/06 705/7.13 |
| 2010/0274618 A1* | 10/2010 | Byrd | ..................... | G06Q 10/10 704/275 |

(Continued)

*Primary Examiner* — William Spieler

(57) ABSTRACT

A collaboration system for information sharing in an enterprise is disclosed. The collaboration system includes a monitoring module configured to monitor a communication for one or more parameters. The collaboration system further includes an information management module configured to select one or more data items from one or more databases based on the one or more parameters, wherein each of the data items includes an associated score. The collaboration system further includes a ranking module configured to score the one or more selected data items. The collaboration system further includes a database management module configured to update the one or more databases with the score of the one or more selected data items.

15 Claims, 6 Drawing Sheets

(56) References Cited

U.S. PATENT DOCUMENTS

| | | | |
|---|---|---|---|
| 2010/0296417 A1 | 11/2010 | Steiner et al. | |
| 2013/0066693 A1* | 3/2013 | Laird-McConnell | G06Q 30/02 705/14.11 |
| 2013/0136253 A1* | 5/2013 | Liberman Ben-Ami | H04M 3/5191 379/265.09 |
| 2013/0290430 A1* | 10/2013 | Yung | G06Q 50/01 709/204 |
| 2014/0074728 A1* | 3/2014 | Margulies | G06Q 30/01 705/304 |
| 2014/0095608 A1* | 4/2014 | Mandalia | G06F 17/30038 709/204 |
| 2014/0304249 A1* | 10/2014 | Ayzenshtat | G06F 17/3053 707/709 |
| 2014/0321633 A1 | 10/2014 | Erhart et al. | |
| 2014/0324717 A1* | 10/2014 | Ayers | G06Q 50/01 705/319 |
| 2014/0329210 A1* | 11/2014 | Masood | G06Q 10/103 434/219 |
| 2014/0342725 A1* | 11/2014 | Taylor | H04W 4/027 455/419 |
| 2014/0344258 A1* | 11/2014 | Khandelwal | G06F 17/30867 707/723 |
| 2015/0081802 A1* | 3/2015 | Borenstein | H04L 51/04 709/206 |
| 2015/0088801 A1* | 3/2015 | Sbaiz | H04L 67/22 706/52 |
| 2015/0170152 A1* | 6/2015 | Shaffer | G06Q 30/016 705/304 |

\* cited by examiner

SYSTEM AND METHOD FOR INFORMATION SHARING IN AN ENTERPRISE

BACKGROUND

Field

Embodiments of the present invention generally relate to a system and method for information management and particularly to a system and method for information sharing in an enterprise.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response units (IVR)), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. In present-day Automatic Call Distributions (ACDs) when the ACD system detects that an agent has become available to handle a contact, the ACD system identifies all predefined contact-handling queues for the agent (usually in some order of priority) and delivers to the agent with the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that can increase the service level agreement of the contact center.

Typically, the business goals of the contact center are achieved when the agents solve the customer's queries in a short interval of time with customer satisfaction. Sometimes, while solving the customer's queries, the agents need assistance or help from other agents or supervisors of the contact center. For this purpose, the agents may rely on their personal contacts that may help them to solve the customer's queries based on their existing relationships with the agents. For example, an agent "A" with a customer query related to mobile phones may ask for help from another agent "B" who is an expert in fixing mobile phones when the agent "A" is having a good relationship (e.g., friends) with the agent "B". Otherwise, the agent may ask for assistance from the supervisor of the contact center. The supervisor may then provide a predefined script on the agent's computer screen to solve the customer's queries. Further, while using the predefined scripts the customer's queries may be escalated that further results in delays, higher costs, and customer dissatisfaction. Also, based on the supervisor' assistance (providing predefined scripts to agents), a credit and/or an incentive is rewarded to the supervisors. Conventionally, these credits can be assigned to the supervisors through mocks and dashboards. However, no rewards and/or incentives are provided to the agents such as, for utilizing predefined scripts provided by the supervisor.

Conventional techniques do not encourage the agents, supervisors or Subject Matter Experts (SMEs) to collaborate within the contact center to solve the complex customer's queries. Furthermore, these techniques do not build a social-networking based collaborative environment for sharing information with other agents of the contact center.

There is thus a need for a system and method for information sharing to encourage agents and experts to engage with the agents to solve complex customer-originating queries and provide incentives when doing so.

SUMMARY

Embodiments in accordance with the present invention provide a collaboration system for information sharing in an enterprise. The collaboration system includes a monitoring module configured to monitor a communication for one or more parameters. The collaboration system further includes an information management module configured to select one or more data items from one or more databases based on the one or more parameters, wherein each of the data items includes an associated score. The collaboration system further includes a ranking module configured to score the one or more selected data items. The collaboration system further includes a database management module configured to update the one or more databases with the score of the one or more selected data items.

Embodiments in accordance with the present invention further provide a computer-implemented method for information sharing in an enterprise. The computer-implemented method includes monitoring a communication for one or more parameters, selecting one or more data items from one or more databases based on the one or more parameters, wherein each of the data items includes an associated score, scoring the one or more selected data items, and updating the one or more databases with the score of the selected one or more data items.

Embodiments in accordance with the present invention further provide a computer-implemented method for information sharing in an enterprise. The method includes monitoring a communication for one or more parameters, selecting one or more data items from one or more databases based on the one or more parameters, wherein each of the data items includes an associated score, scoring the one or more selected data items, updating the one or more databases with the score of the selected one or more data items, and rewarding one or more agents for reusing the one or more selected data items.

The present invention can provide a number of advantages depending on its particular configuration. First, the present invention provides a system and a method for information sharing in a contact center to enable collaboration between the agents. The present invention also provides a social-networking based collaborative environment through which the agents and Subject Matter Experts (SMEs) may share and reuse their knowledge. Next, the present invention encourages the agents and the SMEs to share their knowledge within the contact center that may further help the agents to solve the customer's queries. The agents and the SMEs may share their knowledge in a collaborative environment through articles, journals, wikis, and so forth. The agents, supervisors and the Subject Matter Experts (SMEs) gain mutual rewards for their collaboration efforts such as information sharing within the contact center.

Further, the present invention provides rewards to the agents and the SMEs when their contributed information is utilized by other agents of the contact center. The agents may provide a score to the contributed information they used for providing the customer service and based on which rewards are awarded to the SMEs for sharing the knowledge. Also, the agents who provided scores to the contributed information also get rewarded for reusing the contributed information. Furthermore, the present invention helps the supervisors to identify qualified agents within the contact center based on their contributed information.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1A:
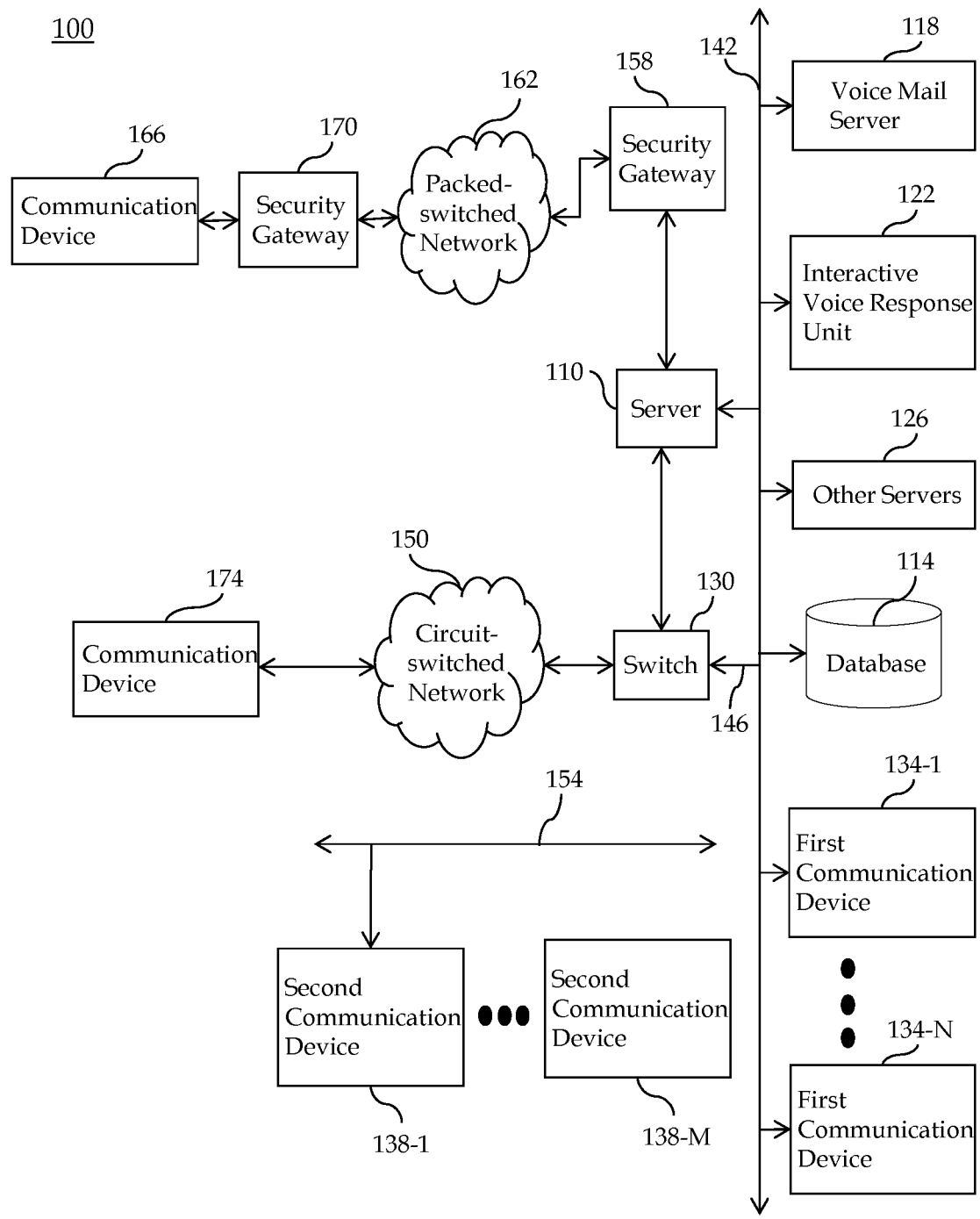
FIG. 1A illustrates a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact (or call) or customer related information, data items, and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The database 114 may store information contributed by agents and Subject Matter Experts (SMEs). In an embodiment of the present invention, the contributed information may be stored in one database of the contact center 100. The contributed information may be stored in more than one database of the contact center 100, in another embodiment of the present invention. Further, the database 114 may also store an associated score of the contributed information provided by the agents and the SMEs of the contact center 100. In another embodiment of the present invention, the database 114 may also store scores associated with the agents and the SMEs contributed the information within the contact center 100. In an embodiment of the present invention, the scores associated with the agents, SMEs and the contributed information may be stored in a table within the database 114 of the contact center 100.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) can be Avaya Inc.'s, G700 Media Gateway™ and may be implemented as hardware such as via an adjunct processor (as shown) or as a chip in the server.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext1-M, respectively. The second communication devices 138-1-M may include, for example, wired and wireless telephones, PDAs, H.320 video phones and conferencing units, voice messaging and response units, traditional computer telephony adjuncts, and any other communication devices.

It should be noted that the present invention does not require any particular type of information transport medium between switch, or server and first and second communication devices, i.e., the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In a preferred configuration, the server 110, the packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1A is for purposes of illustration only and should not be construed as limiting the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
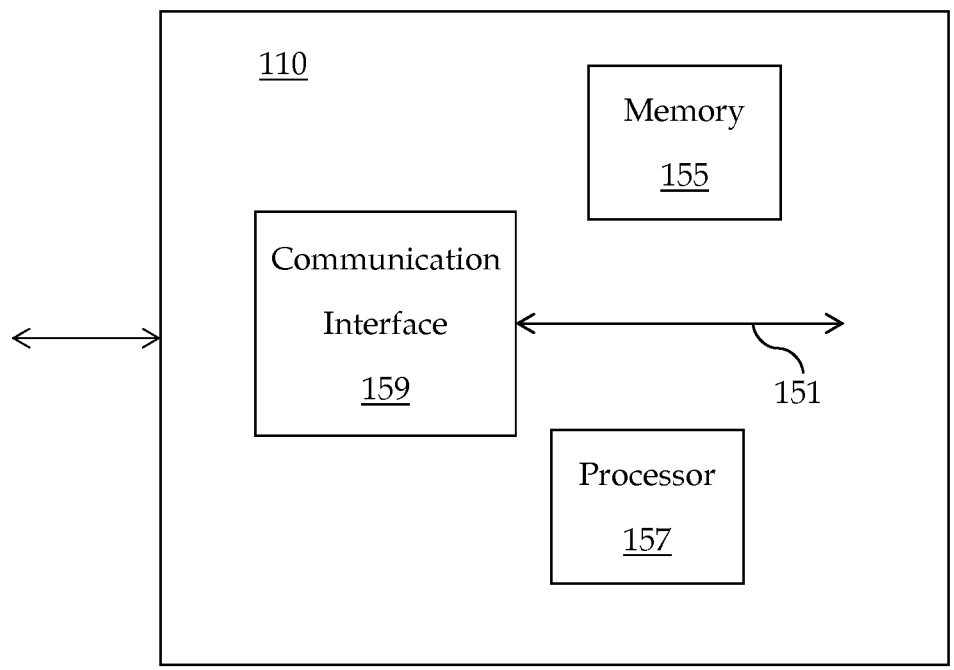
FIG. 1B illustrates a high level hardware abstraction of a block diagram of a server, according to an embodiment of the present invention.

FIG. 1B illustrates at a relatively high level of hardware abstraction a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out the various functions of the server 110.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks. The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
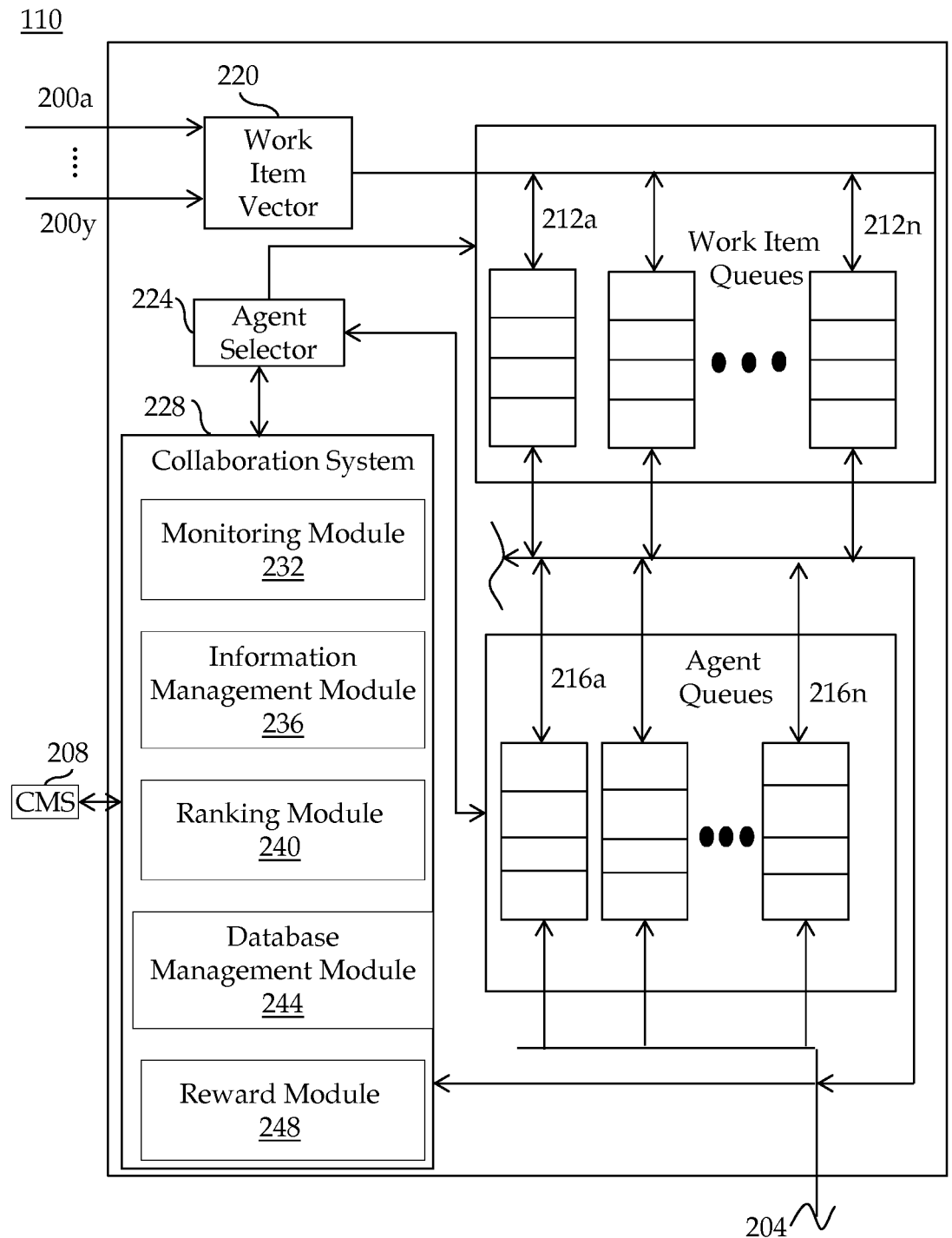
FIG. 2 illustrates a functional block diagram of the server according to an embodiment of the present invention.

Referring to FIG. 2, one possible configuration of the server 110 is depicted. The server 110 is in communication with a plurality of customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s an Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of agent queues 216a-n. Each contact queue 212a-n corresponds to a different set of agent queues, as does each agent queue 216a-n. Conventionally, contacts are prioritized and either is enqueued in individual ones of the contact queues 212a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 216a-n in their order of expertise level or are enqueued in different ones of a plurality of agent queues 216a-n that correspond to a queue and each one of which corresponds to a different expertise level.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including customer identity, customer needs, contact center needs, current contact center queue lengths, customer value, and the agent skill that is required for proper handling of the contact. Agents who are available for handling work items are assigned to agent queues 216a-n based upon the skills that they possess. An agent may have multiple skills, and hence may be assigned to multiple agent queues 216a-n simultaneously. Furthermore, an agent may have different levels of skill expertise (e.g., skill levels 1-N in one configuration or merely primary skill levels and secondary skill levels in another configuration), and hence may be assigned to different agent queues 216a-n at different expertise levels.

Further, included among the programs executing on the server 110 are an agent selector 224 and a collaboration system 228. The agent selector 224 and the collaboration system 228 are stored either in the main memory or in a peripheral memory (e.g., disk, CD ROM, etc.) or some other computer-readable medium of the contact center. Further, the agent selector 224 monitors the occupants of the work item and queues 212a-n and 216a-n, respectively, and contact center objectives, rules, and policies and assigns agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center. Upon the completion of handling a work item, a generator (not shown) collects selected metrics for the work item. These metrics may include skills involved in servicing the work item, an identifier of a servicing agent, contact duration, a transaction or contact type (e.g., sale, information request, complaint, etc.), time-of-day, result of the call (e.g., type of sale, number of units sold, an average revenue generated, etc.), rating of another party, such as the agent's supervisor or another observer, of how the work item was serviced, whether the agent requested assistance, etc. and stores the information in the database 114, such as the CMS 208.

The collaboration system 228 may identify centrality or density of nodes in a social network (e.g., agents within the contact center 100) with respect to a specific problem an agent is trying to solve on behalf of the customer. The agent then needs to enlist help of Subject Matter Experts (SMEs) by filtering the social network of the contact center 100 with tags associated with the ongoing incoming call. In an embodiment of the present invention, the SMEs may be identified either through a system setup that assigns skills to the agents, or through a social network that may help to identify other skills of the agents for which the agent has demonstrated an aptitude.

The collaboration system 228 may further use a gamification approach to encourage the agents and SMEs to collaborate within the contact center 100. In an embodiment of the present invention, the collaboration may include, but is not restricted to, knowledge transfer, knowledge sharing, reuse of knowledge, knowledge contribution, and so forth. The collaboration system 228 may also enable the SMEs and agents of the contact center 100 to contribute information, such as blogs, wikis, articles, publications, etc. associated with a technology or a domain (e.g., policies, car fixing, etc.) within the social network of the contact center 100. The information may be used by the agents in order to solve the customer's queries or problems. For example, an agent dealing with a customer may utilize the contributed information in a certain way to provide better services to the customer. Further, based on their reuse of the contributed information, the agents may rank the contributed information, and the SMEs and the agents contributed the information may get mutual rewards or incentives for their collaborative efforts. In an embodiment of the present invention, the collaboration system 228 may also provide rewards and/or incentives to the agents, when the agents finish/complete the incoming customer call and achieve a desired business goal of the contact center 100. For example, a reward is provided to the agent if the agent completes an incoming call within a predefined time limit such as, 1 minute, and achieves a desired business goal (Customer Satisfaction (CSAT)) of the contact center.

According to an embodiment of the present invention, the collaboration system 228 includes a monitoring module 232, an information management module 236, a ranking module 240, a database management module 244, and a reward module 248.

The monitoring module 232 may monitor parameters of an incoming call, in an embodiment of the present invention. The monitoring module 232 may monitor a type of the incoming call i.e., whether the call made by a caller (e.g., customer) is a video call, a voice call, a textual call, an email, an instant messaging, or a text. Further, the monitoring module 232 may monitor static details about the incoming call, for example, inputs selected by the caller in an IVR menu of the contact center 100. For example, if the caller selects 'healthcare option' in an IVR menu and further selects 'claims enquiry', then the monitoring module 232 may store 'healthcare' and 'claim enquiry' as parameters of the incoming call, in the database 114 of the contact center.

The monitoring module 232 is configured to monitor communication between the agent and the caller during the call for the parameters of the call, in another embodiment of the present invention. Furthermore, the monitoring module 232 may extract keywords or phrases from the monitored call and communication between the agent and the caller. For example, the caller provides information that he desires to inquire about healthcare policies for children then "healthcare policies" and "children" may be extracted as keywords from the monitored communication. In an embodiment of the present invention, if the type of call is a text conversation such as an instant messaging, or an email, then the monitoring module 232 may analyze the text messages and then extract keywords from the communication. In another embodiment of the present invention, if the type of call is a voice communication, then speech of the caller and the agent is converted into text, which is then analyzed. Based on the analysis, the monitoring module 232 extracts keywords or phrases from the text as parameters. In one embodiment of the present invention, monitoring of the call is carried out in a real time environment.

The information management module 236 may search for data items from the database 114, in an embodiment of the present invention. The information management module 236 may search the data items from the database 114 that matches with the parameters. The data items may include, but is not restricted to, articles, blogs, journals, wikis, publications, bulletins, and so forth. Further, each of the data items stored in the database 114 is associated with a score. In an embodiment of the present invention, the data items may be provided by the Subject Matter Experts (SMEs) who is an expert in a specific technology or a domain. The data items may also be provided by the agents of the contact center 100, in another embodiment of the present invention. In yet another embodiment of the present invention, the SMEs may be agents of the contact center 100. In another embodiment of the present invention, the information management module 236 may use case based reasoning approach for determining useful data items associated with the customer's queries. This approach may utilize historical information, events and cases that may be used to solve similar queries of the customers. The information management module 236 may select the data items from the database 114 based on the monitored parameters of the communication. For example, in this case, the keywords "healthcare policies" and "children" are matched with the stored data items provided by the agents and SMEs of the contact center 100.

Further, the information management module 236 may enable the SMEs and the agents to add data on a blog environment or a wiki environment within the contact center 100, in an embodiment of the present invention. The SMEs and the agents may add more data items in the database 114 of the contact center 100. In another embodiment of the present invention, the information management module 236 may also enable the SMEs and the agents to update or modify the information of the data items stored in the database 114. In an embodiment of the present invention, the data items shared and/or utilized by the agents, supervisors, and/or SMEs of the contact center 100 within the social network may be monitored by the monitoring module 232.

Furthermore, the information management module 236 may display the matched information on the agent's desktop or computer screen to solve the customer's queries. The data items may be provided to the agent handling the call through, but is not limited to, a video call, a voice call, an email, a text message, or a pop-up on the agent's computer screen. In an embodiment of the present invention, the information management module 236 may display a plurality of notifications such as a beep, a flash, a prompt, a chat, and a popup on the agent's computer screen to utilize the matched data items for providing services to the customer. For example, an article having information related to healthcare policies for children is selected and is displayed on the agent's computer screen.

The ranking module 240 may enable the agent to tag or score the displayed data items, in an embodiment of the present invention. The agent may score the data items according to its relevance in solving the customer's queries. If the agent of the contact center 100 determines that the displayed data item is useful while handling the incoming call, the agent may then score the data item accordingly. In an embodiment of the present invention, the agent may score the data items by providing a score (e.g., 1, 2, 3, etc.) to the data items. The agent may also tag himself in the data item as an agent who finds the data item as a useful data item, in another embodiment of the present invention. These tags may be used to filter a widget on the agent's computer screen to display relevant data item within the blogs and/or wikis contributed by the SMEs. The agent may also provide a star rating (e.g., 3 star, 4 star, etc.) or thumbs up to the data item, in yet another embodiment of the present invention.

Further, if the agent did not find the displayed data item as a useful data item, then the agent may provide a low score to the data item, in another embodiment of the present invention. For example, the agent may provide a score (e.g., 1 out of 5) to the displayed data item, or may provide a star rating of 2 stars to the displayed data item. Further, the agent of the contact center 100 may also give thumbs down to the displayed data item if the displayed data item is not useful in solving the customer's queries, in another embodiment of the present invention. The ranking module 240 may allow the agents to add comments or feedbacks to the displayed data item, in another embodiment of the present invention.

The database management module 244 may update the score of the selected data item, according to an embodiment of the present invention. The score of the data item is updated based on the score provided by the agents of the contact center 100. The score of the data item stored in the database 114 may be updated periodically, in an embodiment of the present invention. The score of the data item may be updated in real time environment when a particular problem comes in the contact center 100, in another embodiment of the present invention.

Further, the database management module 244 may update the score of the SMEs based on the score of the data item provided by the agents of the contact center 100. Furthermore, the database management module 244 may update the score of the agents based on their responses to the displayed data item. The response may include, but is not restricted to, ratings, tags, scores, thumbs up, thumbs down, comments, feedbacks, etc. provided by the agents of the contact center 100. In an embodiment of the present invention, the scores of the agents may help supervisors or managers of the contact center 100 to discover new talents within the workforce. For example, if an agent who is an expert in fixing cars has written an article and agents of a car department are using the article again and again, then the agent and his expertise is recognized by the supervisors of the contact center 100. It may also help the supervisors or managers to identify qualified agents, or at least their scope of qualifications within the contact center 100.

The reward module 248 may provide rewards or incentives through points to the SMEs of the contact center 100. In an embodiment of the present invention, the rewards may be provided to the SMEs based on their contribution of data items to a blog or wiki within the contact center 100. The SMEs may also get rewards when the contributed data items are tagged by the agents of the contact center 100 as being useful in solving the customer's queries or problems, in another embodiment of the present invention. Further, the SMEs may also get rewarded when they respond to the agent's comments on their contributed data items, or on other entries of the data items on a blog, or wiki of the contact center 100. In yet another embodiment of the present invention, when the SMEs responds directly to an agent to solve a specific problem of a customer, the reward module 248 may then provide rewards to the SMEs.

Further, the reward module 248 may also provide rewards or incentives to the agents of the contact center 100. In an embodiment of the present invention, the rewards may be provided to the agents when they utilize pre-existing SME generated data items in order to solve the customer's queries. The amount of reward provided to the agents may be rated based on some statistics such as, but is not restricted to, a first call resolution, an average handling time, a customer satisfaction, and so forth.

In another embodiment of the present invention, when the agents enlist help of the SMEs for solving the customer's queries with the statistics (as discussed above), the reward module 248 may then provide rewards to the agents. The agents may be provided with the rewards when the agents contribute to the existing data items such as through comments, feedbacks based on their specific customer problems, and so forth. Further, when the agents contribute new data items to the blogs and/or wiki of the contact center 100, the reward module 248 may provide rewards to the agents, in yet another embodiment of the present invention. The reward module 248 may also provide rewards and/or incentives such as, but is not restricted to, a coupon, a gift card, an event ticket, a letter of appreciation, and so forth.

Further, the reward module 248 may provide extra rewards and/or incentives to the agents and/or supervisors for completing tasks and/or steps of a process or predefined script disclosed in the data item displayed on the agent's computer screen. Each task of the process or script is further associated with a reward point, in an embodiment of the present invention. For example, if the agent completes all steps of the data item displayed on the agent's computer screen and achieves a desired business goal (e.g., SLA) that further improves the contact center efficiency, then an extra reward and/or incentive associated with the steps is provided to the agent. In another embodiment of the present invention, the reward module 248 may provide negative rewards or points to the agent if the customer is not satisfied with the customer service provided by the agent which further decreases the contact center efficiency.

Figure 3:
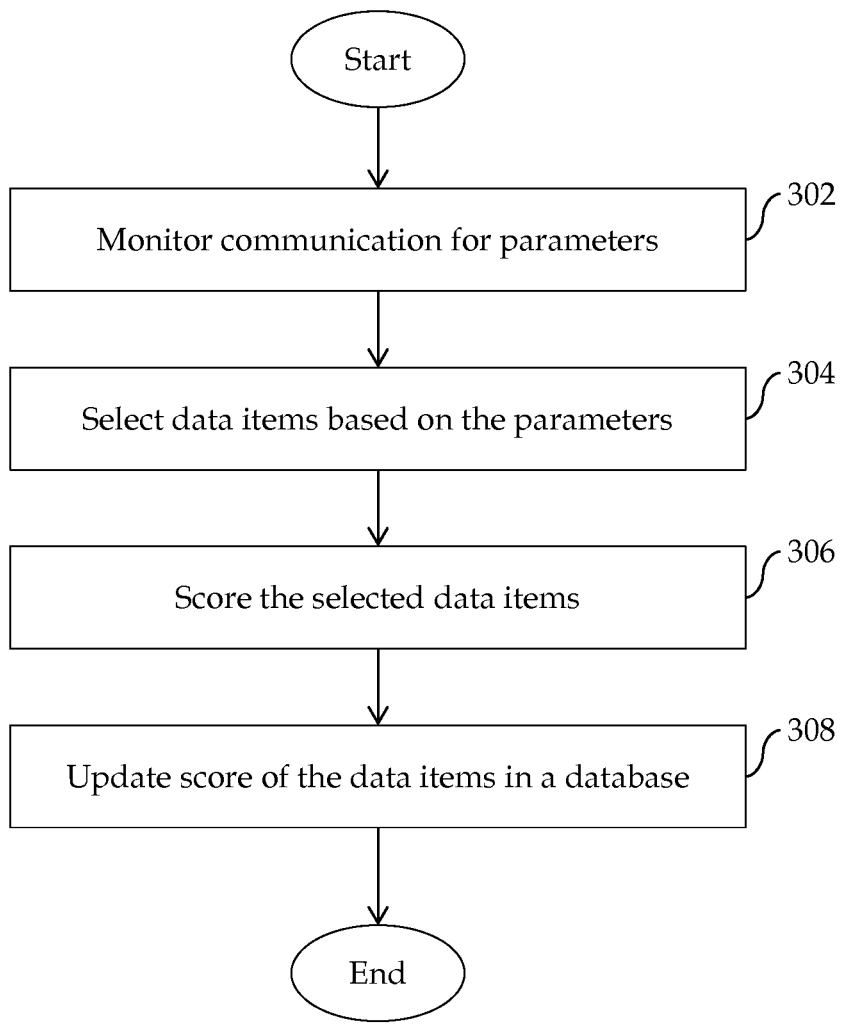
FIG. 3 depicts a flowchart of a method for information sharing in the contact center, according to an embodiment of the present invention.

FIG. 3 depicts a flowchart of a method 300 for information sharing in a contact center, according to an embodiment of the present invention. At step 302, a collaboration system 228 monitors communication between an agent and a customer of an incoming call for parameters. The parameters of the monitored communication may include, but is not restricted to, type of call (e.g., a voice call, a video call, an email, a text message, etc.), keywords extracted from the monitored communication, and so forth.

At step 304, the collaboration system 228 selects data items based on the parameters, according to an embodiment of the present invention. The collaboration system 228 matches the monitored parameters with the data items stored in the database 114. The data items may include, but is not restricted to, an article, a blog, a journal, a wiki, a publication, a bulletin, and so forth. In an embodiment of the present invention, each of the data items is associated with a score. Further, the data items may be shared by agents and Subject Matter Experts (SMEs) of the contact center 100. In another embodiment of the present invention, the SMEs may be the agents of the contact center 100. The data items and their associated scores are stored in the database of the contact center 100. Further, the data items match with the monitored parameters are selected by the collaboration system 228 and are then displayed on an agent's computer screen.

At step 306, the collaboration system 228 scores the selected data items. In an embodiment of the present invention, the agent reusing the selected data items may score the data items. The agent may score the data items by providing a rank, a star rating, a vote, a score, a thumbs up, a thumbs down, a tag, and so forth. In another embodiment of the present invention, the collaboration system 228 may automatically score the data items when the selected data items are displayed on the agent's computer screen.

At step 308, the collaboration system 228 updates scores of the selected data items in a database of the contact center 100. In an embodiment of the present invention, the score of the selected data items are updated based on the score provided by the agent handling the call. In another embodiment of the present invention, the scores of the associated agent and the SMEs who shared the selected data items are also updated in the database of the contact center 100.

Further, the collaboration system 228 rewards the agents of the contact center 100 for reusing the selected data items. In another embodiment of the present invention, the collaboration system 228 rewards the SMEs for sharing the selected data items within the contact center 100. The rewards and/or incentives may include, but is not restricted to, a coupon, a gift card, an event ticket, a letter of appreciation, and so forth.

Figure 4A:
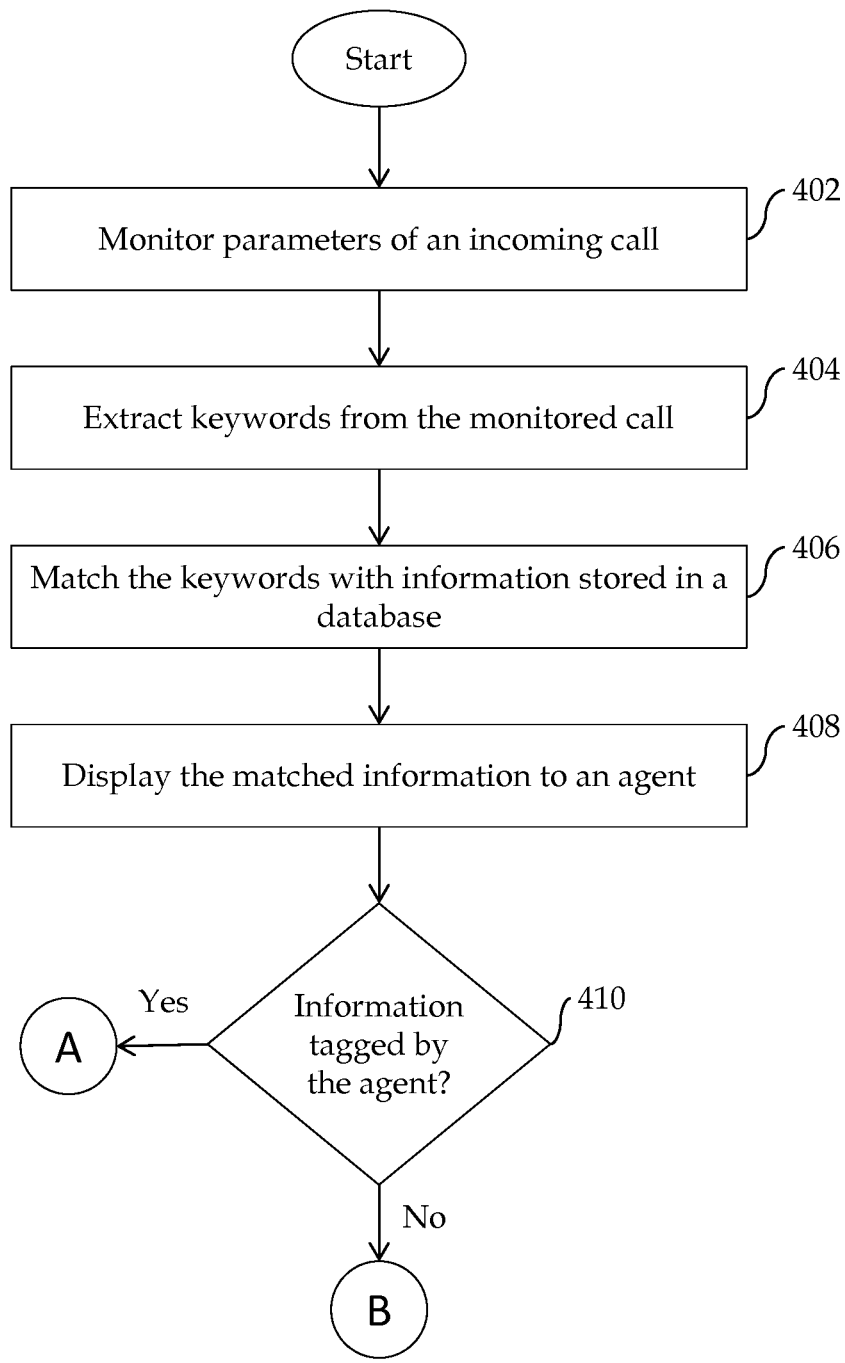
FIGS. 4A and 4B depict a flowchart of a method for information sharing in the contact center, according to another embodiment of the present invention.
Figure 4B:
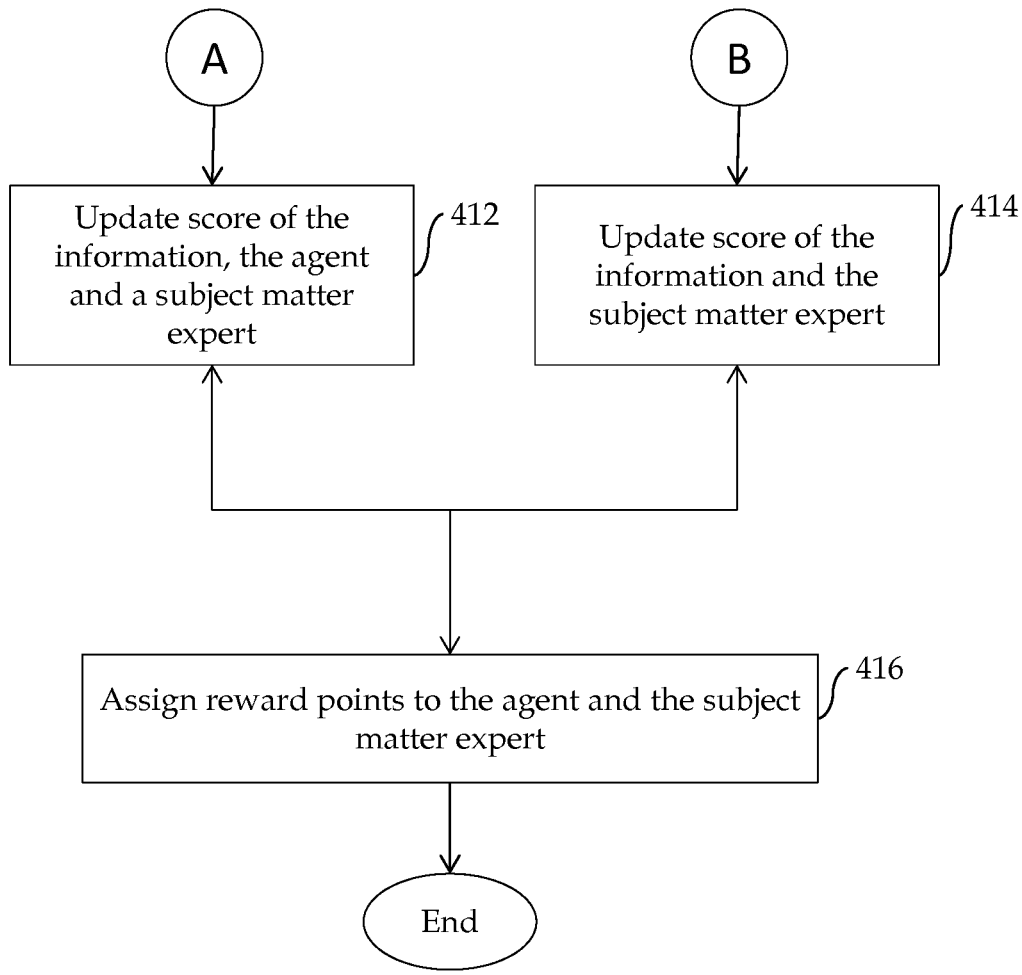

FIGS. 4A and 4B depict a flowchart of a method 400 for sharing information in the contact center, according to another embodiment of the present invention. At step 402, a collaboration system 228 monitors parameters of an incoming call received from a caller (or a customer). In an embodiment of the present invention, the parameters may include a type of the incoming call i.e., whether the call made by the caller is a video call, a voice call, a textual call, an email, an instant messaging, or a text message. Further, static details about the incoming call are also monitored, for example, inputs selected by the caller in an IVR menu of the contact center 100. Furthermore, the collaboration system 228 also monitors communication between the agent and the caller during the call.

At step 404, the collaboration system 228 extracts keywords or phrases from the monitored call and communication between the agent and the caller. For example, the caller provides information that he desires to inquire about healthcare policies for children then "healthcare policies" and "children" may be extracted as keywords from the monitored call and their communication.

At step 406, the collaboration system 228 matches the keywords with data items stored in a database of the contact center 100. The collaboration system 228 performs lookup in the database for data items that matches with the parameters from the monitored communication. For example, in this case, the keywords "healthcare policies" and "children" are matched with the data items stored in the database of the contact center 100. The collaboration system 228 selects one or more data items from the database that matches with the parameters of the communication. The data items may include, but is not restricted to, an article, a blog, a journal, a wiki, a publication, a bulletin, and so forth, which is associated with the keywords "healthcare policies." In an embodiment of the present invention, the data items may be provided by a Subject Matter Experts (SMEs) who is an expert in healthcare department. The data items may also be provided by the agents of the contact center 100 who handles incoming calls related to healthcare queries, in another embodiment of the present invention.

At step 408, the collaboration system 228 displays the selected data items on the agent's computer screen to solve query or problem of the caller. The selected data items may be provided to the agent through, but is not limited to, a video call, a voice call, an email, a text message, or a pop-up on the agent's computer screen. For example, an article is selected as a most suitable article for the customer that matches with the parameters of the monitored communication on healthcare policies for children. In an embodiment of the present invention, the collaboration system 228 displays a plurality of notifications such as a beep, a flash, a prompt, a chat, and a popup on the agent's computer screen after displaying the selected data item.

At step 410, the collaboration system 228 determines whether the displayed data item is tagged by the agent handling the call or not. In an embodiment of the present invention, tagging of the data item may include, but is not restricted to, to provide a vote, a star rating, a score, thumbs up, thumbs down, a comment, a feedback, and so forth. If the displayed data item is tagged by the agent handling the incoming call then the method 400 proceeds towards step 412. Otherwise, the method 400 proceeds towards step 414.

At step 412, the collaboration system 228 updates the database with the score of the displayed data item. In an embodiment of the present invention, the score of the displayed data item is updated based on the tag provided by the agent handling the call. For example, in this case, the agent handling the call finds the displayed article as useful, then the agent provides a star rating (e.g., 5 star) to the displayed article. Further, score of the agent who provides the tag to the data item is also updated in the database of the contact center 100. Furthermore, score of a SME who contributes the displayed data item is also updated in the database of the contact center 100.

At step 414, the collaboration system 228 updates the database with the score of the displayed data item. Further, score of the SME who contributes the displayed data item is also updated in the database of the contact center 100. For example, if the agent does not tag the article, then score of the article and the SME who contributed the article is degraded as the data item is not useful for the agent handling the call.

At step 416, the collaboration system 228 assigns reward points to the agent and the SME. The SME shared the data item is rewarded and/or incentivized through points for sharing the useful data item among the agents of the contact center 100. The agent is rewarded and/or incentivized through points for utilizing the shared data item while providing services to the customer. In an embodiment of the present invention, the rewards and/or incentives may be provided through other rewards such as a coupon, a gift card, an event ticket, a letter of appreciation, and so forth.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions.

Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A collaboration system for information sharing in an enterprise, the collaboration system comprising a processor connected with a memory, the processor using programming code:
    to monitor a customer communication for one or more keywords or phrases;
    to extract one or more keywords or phrases from the customer communication;
    to select one or more data items from one or more databases based on the one or more keywords or phrases extracted from the monitored communication, wherein the one or more data items is provided by one or more Subject Matter Experts (SMEs) of the enterprise or one or more agents of the enterprise and wherein each of the data items includes an associated score;
    to provide the selected one or more data items to a computer associated with an agent of the enterprise handling the customer communication;
    to receive from the agent of the enterprise handling the customer communication a score of the one or more selected data items indicating its relevance in solving a customer's query;
    to update a score associated with an agent or an SME based on the score received from the agent of the enterprise handling the customer communication, wherein the agent or the SME having their score updated provided the one or more selected data items;
    to update a score of the agent of the enterprise handling the customer communication from whom the score was received; and
    to update the one or more databases by updating the score of the one or more selected data items based on the score received from the agent of the enterprise handling the customer communication.

2. The collaboration system of claim 1, wherein the one or more data items comprise at least one of an article, a blog, a journal, a wiki, a publication, or a bulletin.

3. The collaboration system of claim 1, wherein the processor is further configured to use programming code to match the one or more keywords or phrases with the one or more data items stored in the one or more databases.

4. The collaboration system of claim 1, wherein the processor is further configured to use programming code to receive the one or more data items from the one or more Subject Matter Experts (SMEs) or the one or more agents and to add the one or more data items in the one or more databases.

5. The collaboration system of claim 1, wherein the processor is further configured to use programming code to update the one or more data items stored in the one or more databases.

6. The collaboration system of claim 1, wherein the processor is further configured to use programming code to display the one or more data items through at least one of a video call, a voice call, an email, an instant message, a text message, or a popup.

7. The collaboration system of claim 1, wherein the score of the one or more data items comprises at least one of a star rating, a vote, a rank, a thumbs up, a thumbs down, or a tag.

8. The collaboration system of claim 1, wherein the processor is further configured to use programming code to reward one or more agents to reuse the one or more data items.

9. The collaboration system of claim 8, wherein the rewards comprise at least one of a point, a coupon, a gift card, an event ticket, or a letter of appreciation.

10. The collaboration system of claim 1, wherein the processor is further configured to use programming code to reward the one or more Subject Matter Experts (SMEs) or the one or more agents of the enterprise who provided the one or more data items for contributing the one or more data items.

11. The collaboration system of claim 10, wherein the processor is further configured to use programming code to reward the one or more Subject Matter Experts (SMEs) or the one or more agents of the enterprise who provided the one or more data items when the agent of the enterprise handling the customer communication provided the score to the one or more selected data items.

12. A computer-implemented method for sharing information in a contact center, the method comprising:
- monitoring, by a computer of the contact center, a communication for one or more keywords or phrases;
- extracting, by the computer of the contact center, one or more keywords or phrases from the communication;
- selecting, by the computer of the contact center, one or more data items from one or more databases based on the one or more keywords or phrases extracted from the monitored communication, wherein the one or more data items is provided by one or more Subject Matter Experts (SMEs) of the contact center or one or more agents of the contact center, wherein each of the data items includes an associated score;
- providing, by the computer of the contact center, the selected one or more data items to a computer associated with an agent of the contact center handling the communication;
- receiving, by the computer of the contact center, from the agent handling the communication a score of the one or more selected data items indicating its relevance in solving a customer's query;
- updating, by the computer of the contact center, a score associated with an agent or an SME based on the score received from the agent of the enterprise handling the customer communication, wherein the agent or the SME having their score updated provided the one or more selected data items;
- updating, by the computer of the contact center, a score of the agent of the enterprise handling the customer communication from whom the score was received; and
- updating, by the computer of the contact center, the one or more databases by updating the score of the one or more selected data items based on the score received from the agent of the enterprise handling the customer communication.

13. The method of claim 12, further comprising rewarding one or more agents to reuse the one or more selected data items.

14. The method of claim 12, further comprising rewarding the one or more Subject Matter Experts (SMEs) or the one or more agents of the enterprise who provided the one or more data items for contributing the one or more data items.

15. A computer-implemented method for sharing one or more data items in a contact center, the method comprising:
- monitoring, by a computer of the contact center, a communication for one or more keywords or phrases;
- extracting, by the computer of the contact center, one or more keywords or phrases from the communication;
- selecting, by the computer of the contact center, one or more data items from one or more databases based on the one or more keywords or phrases extracted from the monitored communication, wherein the one or more data items is provided by one or more Subject Matter Experts (SMEs) of the contact center or one or more agents of the contact center, wherein each of the data items includes an associated score;
- providing, by the computer of the contact center, the selected one or more data items to a computer associated with an agent of the contact center handling the communication;
- receiving, by the computer of the contact center, from the agent handling the communication a score of the one or more selected data items indicating its relevance in solving a customer's query;
- updating, by the computer of the contact center, a score associated with an agent or an SME based on the score received from the agent of the enterprise handling the customer communication, wherein the agent or the SME having their score updated provided the one or more selected data items;
- updating, by the computer of the contact center, a score of the agent of the enterprise handling the customer communication from whom the score was received;
- updating, by the computer of the contact center, the one or more databases by updating the score of the one or more selected data items based on the score received from the agent of the enterprise handling the customer communication; and
- by the computer of the contact center, rewarding one or more agents of the contact center for reusing the one or more selected data items.

* * * * *